United States Patent Office 3,165,487
Patented Jan. 12, 1965

3,165,487
COATING COMPOSITIONS OF GRAFT COPOLY-
MERS OF ALKALI SALTS OF VINYLPHENYL
ALPHA-AMINOCARBOXYLIC ACIDS AND BU-
TADIENE-STYRENE COPOLYMERS AND METH-
OD OF MAKING THE SAME
John Berten Gardner and Billy Gene Harper, Lake Jackson, Tex., assignors to The Dow Chemical Company, Midland, Mich., a corporation of Delaware
No Drawing. Filed Dec. 21, 1960, Ser. No. 77,298
12 Claims. (Cl. 260—29.7)

This invention concerns new coating compositions comprising aqueous dispersions of graft copolymers of alkali salts of vinylphenyl aliphatic carboxylic acids and butadiene-styrene copolymers and pertains to a method of making the same. It relates more particularly to coating compositions comprising aqueous dispersions of graft copolymers of ammonium bases and/or alkali metal salts of vinylphenyl aliphatic alpha amino carboxylic acids and a latex of a previously prepared copolymer of butadiene and styrene, and pertains to a method of making the coating compositions.

The coating compositions of the invention, when applied to the surfaces of metals, dry to form continuous films possessing good adherence and which are highly resistant to corrosion, impact and penetration of water. They are particularly useful as primer coatings for metals, e.g., iron or steel.

It has now been discovered that coating compositions capable of drying to produce continuous films possessing good adherence to metals, high resistance to penetration by water and good impact strength as well as being highly resistant to corrosion and protective of the coated metal can readily be prepared by forming an aqueous dispersion of a graft copolymer by polymerizing a minor proportion of an alkali salt, i.e., the ammonium or an alkali metal salt, of a vinylphenyl amino carboxylic acid having the general formula

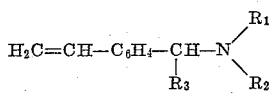

wherein $R_1$ represents a radical selected from the group consisting of —H, —CH$_2$—COOM and radicals of the formula

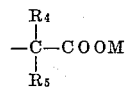

wherein $R_4$ and $R_5$ individually represent a radical selected from the group consisting of —H, —CH$_2$—COOM, —CH$_2$—CH$_2$—COOM and alkyl radicals containing from 1 to 4 carbon atoms, at least one of the radicals $R_4$ and $R_5$ being selected from the group consisting of —H and alkyl, $R_2$ represents a radical selected from the group consisting of —H, —CH$_2$·C$_6$H$_4$·CH=CH$_2$ and

—CH$_2$—COOM $R_3$ represents a radical selected from the group consisting of —H and —COOM at least one of said $R_1$, $R_2$ and $R_3$ radicals containing the carboxyl group, and wherein M is a member of the group consisting of ammonium bases and alkali metals, with a predominant amount of a latex of a previously prepared copolymer of styrene and butadiene.

Examples of suitable alkali salts of suitable vinylphenyl amino carboxylic acids to be employed in the invention are the ammonium, sodium, potassium, lithium and other alkali metal salts of N-(ar-vinylbenzyl)sarcosine, N-(ar-vinylbenzyl)alanine, N-(ar-vinylbenzyl)isovaline, N-(ar-vinylbenzyl)valine, N-(ar-vinylbenzyl)norvaline, N-(ar-vinylbenzyl)leucine, N-(ar-vinylbenzyl)isoleucine, N-(ar-vinylbenzyl)iminodiacetic acid, N-(ar-vinylbenzyl)aspartic acid, N-(ar-vinylbenzyl)glutamic acid, N-(ar-vinylbenzyl)norleucine, N-(ar-vinylbenzyl)aminobutryic acid, N-(ar-vinylbenzyl)amino-isobutyric acid, N-(ar-vinylbenzyl)glycine, 2-(vinylphenyl)glycine, 2-(vinylphenyl)-iminodiacetic acid, 2-(vinylphenyl)nitrilotriacetic acid and N,N-bis(ar-vinylbenzyl)glycine and N,N-bis(ar-vinylbenzyl)aspartic acid.

The coating compositions are aqueous dispersions of graft copolymers of the salts of the vinylphenyl alpha-amino carboxylic acids and the base copolymer of butadiene and styrene in latex form and can contain from about 0.5 to 10, preferably from about 4 to about 8, percent by weight of the alkali salt of the vinylphenyl alpha-amino carboxylic acid graft copolymerized onto the base copolymer of butadiene and styrene and correspondingly they contain from about 99.5 to 90, preferably from about 96 to about 92, percent by weight of said base copolymer.

Among the copolymers of styrene and butadiene which can be employed as starting materials, are copolymers of from about 20 to 75 percent by weight of butadiene and 80 to 25 percent by weight of styrene. Methods of making synthetic latexes of such copolymers by polymerizing a mixture of the monomers in an aqueous emulsion are well known.

In brief, a synthetic latex is prepared by admixing butadiene and styrene in the desired proportions with an aqueous solution consisting of, for example, 99.62 percent by weight of water, 0.13 percent of Aquarex D (the sodium sulfate esters of a mixture of higher alcohols, principally lauryl and myristyl alcohols) as emulsifying agent, 0.99 percent of sodium bicarbonate and 0.16 percent of potassium persulfate as polymerization catalyst, in a closed pressure resistant vessel and heating the mixture at a temperature of 80–95° C. with agitation. The copolymer latex starting material preferably contains at least 20 percent by weight or more, e.g., from 20 to 50 percent by weight, of the copolymer of butadiene and styrene. The latex starting material should have a neutral to alkaline pH value, or if acidic, is preferably adjusted to a neutral to alkaline pH value, e.g., to a pH of from 7 to 10, by addition of an alkali such as ammonia, ammonium hydroxide, or sodium or potassium hydroxide prior to employing the latex for making the graft copolymer dispersions of the invention. Ammonia or ammonium hydroxide is preferred.

The vinylphenyl alpha-amino carboxylic acid alkali salts can be prepared by reaction of an alkali metal hydroxide or ammonia or ammonium hydroxide, with the acid, e.g., the ammonium salt of N-(ar-vinylbenzyl)-iminodiacetic acid is prepared in accordance with Example 1 of U.S. Patent No. 2,840,603. Salts of other vinylphenyl alpha-amino carboxylic acids can be prepared in like manner.

The coating compositions, comprising aqueous colloidal dispersions of the graft copolymer containing from about 25 to 50 percent by weight or more of graft copolymer, can readily be prepared by subjecting the synthetic latex of the base copolymer of butadiene and styrene starting material containing from 20 to 50 percent by weight of the copolymer to high energy ionizing radiation such as gamma rays, high speed electrons, X-rays or radiation from atomic piles or reactors, in a field having an intensity of at least 40,000 rads per hour and for a total dose of from 1 to 10 megarads to provide active sites along the polymer chains at which the grafting will occur. Thereafter, the irradiated latex is admixed with the alkali salt of one or more of the vinylphenyl alpha-amino carboxylic acids, e.g., diammonium vinylbenzyl iminodiacetate, in the desired proportions and the graft copolymerization is allowed to proceed until the polymerization of the monomers is complete or substantially complete. The polymerization can readily be carried out at room temperature or thereabout, but higher or lower temperatures can be used. The polymerization is usually complete in from 5 to 10 hours or less at room temperature. The process can be carried out batchwise or in continuous manner. For example, the latex of the copolymer of styrene and butadiene can be flowed continuously as a stream under a beam of high speed electrons from a General Electric Resonant Transformer, thereby subjecting it to the desired dosage of radiation to produce active sites along the polymer chains, then mixed with the salt of the monomeric vinylphenyl alpha-amino carboxylic acid in the desired proportions, thence through a polymerization zone to produce the graft copolymer composition. Alternatively, the vinylic carboxylate can be mixed with the latex and the mixture thereafter subjected to high energy ionizing radiation to effect the graft copolymerization.

In an alternate procedure, the latex of the copolymer of styrene and butadiene starting material can be admixed with the salt of the vinylphenyl alpha-amino carboxylic acid in the desired proportions, and a usual peroxygen polymerization catalyst, such as sodium persulfate, potassium persulfate, ammonium persulfate, lauroyl peroxide, acetyl peroxide, or the like added, then by heating the mixture at temperatures between about 60° and 95° C., the monomeric vinylphenyl alpha-amino carboxylic acid salt is graft copolymerized onto the base copolymer.

Additives such as stabilizers, antioxidants, plasticizers, thickening agents, pigments, dyes, etc., can be incorporated with the aqueous colloidal dispersions of the graft copolymer compositions if desired.

In a preferred embodiment of the invention the coating compositions comprise the aqueous colloidal dispersion of the graft copolymer in admixture with an iron oxide pigment such as red iron oxide, or yellow iron oxide. Such pigmented compositions are particularly useful as primer coatings for metals or metal articles such as automobile bodies, structural steel or sheet steel buildings.

The following examples illustrate ways in which the principle of the invention has been applied but are not to be construed as limiting its scope.

EXAMPLE 1

(A) A synthetic latex containing approximately 45 percent by weight of a copolymer of 60 percent by weight of styrene and 40 percent of butadiene was prepared by polymerizing a mixture of the monomers in an aqueous emulsion, i.e., in admixture with an aqueous solution consisting of approximately 99.62 percent of water, 0.16 percent of potassium persulfate, 0.13 percent of Aquarex D (the sodium salts of sulfate monoesters of a mixture of higher fatty alcohols, chiefly lauryl and myristyl derivatives of the type $RSO_4Na$), and 0.09 percent of sodium carbonate, at a temperature of 95° C.

(B) In each of a series of experiments, a weighed portion of the copolymer of 60 percent by weight of styrene and 40 percent of butadiene, prepared in part A above, was subjected to a beam of high speed electrons from a General Electric Resonant Transformer operating at a beam current of 1 milliampere and 1 mev. potential for a total dose in megarads as stated in the following table. To the irradiated copolymer latex there was added the diammonium salt of N-(ar-vinylbenzyl)iminodiacetic acid of the formula:

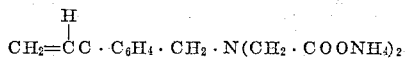

in an amount, based on the weight of the copolymer, as stated in the following table. The resulting mixture was heated at a temperature of 50° C. for a period of 3 hours to graft copolymerize the N-(ar-vinylbenzyl)iminodiacetic acid, diammonium salt onto the copolymer. To the resulting graft copolmer latex there was added, 100 percent based on the weight of the graft copolymer, of a ferric oxide pigment in amount as stated in the table. The resulting pigmented coating composition was applied as a film to one side of a bonderized steel panel by means of a Meyer wire wound rod. This wire applicator was made by winding No. 16 gauge wire (.051 in.) on a rod of ¼ in. diameter. The layer was dried in air. The dried film was baked in an air oven at 300° F. for a period of 30 minutes, then was removed and allowed to cool to room temperature. The coated panels were placed in a water bath at 95° F. so that about one-half of the film coating was immersed in the water for a period of 300 hours. Thereafter, the panels were removed from the water bath and were allowed to cool to room temperature. The coatings were observed for their appearance with respect to rusting, peeling and fading. Table I identifies the experiments and gives the proportions of N-(ar-vinylbenzyl)iminodiacetic, diammonium salt employed in making the graft copolymer. The table also gives the total dose of irradiation to which the copolymer latex was subjected and the proportion of ferric oxide pigment used, based on the weight of the graft copolymer. For purpose of comparison a film was prepared from the non-grafted copolymer and the results are reported in the table.

*Table I*

| Run No. | N-(ar-vinylbenzyl) iminodiacetic Acid Ammonium Salt, Percent | Radiation Dose, Megarads | Pigment Percent | Coating, Remarks |
| --- | --- | --- | --- | --- |
| 1 | 1 | 1.5 | 100 | Good. |
| 2 | 4 | 1.5 | 100 | Excellent. |
| 3 | 9 | 1.5 | 100 | Do. |
| 4 | 1 | 7.5 | 100 | Good. |
| 5 | 4 | 7.5 | 100 | Excellent. |
| 6 | 9 | 7.5 | 100 | Do. |
| 7 | 0 | 7.5 | 100 | Poor. |

EXAMPLE 2

In each of a series of experiments, a synthetic latex of a copolymer of styrene and butadiene in proportions as stated in the following table which latex contained about 45 percent by weight of the copolymer, was subjected to high speed electrons from a General Electric Resonant Transformer operating at a beam current of 1 milliampere and 1 mev. for a total dose of 2.5 megarads. A portion of the irradiated latex was mixed with an aqueous 25 weight percent solution of diammonium N-(ar-vinylbenzyl)iminodiacetate in amount corresponding to 5 percent by weight of the copolymer therein. The mixture was heated at a temperature of 60° C. for a period of 4 hours to graft copolymerize the diammonium N-(ar-vinylbenzyl)iminodiacetate with the copolymer. To the resulting copolymer latex there was added ferric oxide pigment as in Example 1. The resulting coating composition was applied to No. 26 gauge bonderized steel panels by means of the Meyer wire wound rod of Example 1. The coating was dried in air, then was baked for 30 minutes in an air oven at 350° F. After cooling, the baked coating was immersed for about one-half of its length in a water bath maintained at 95° F. for a period of 300 hours, then was removed and the coating observed. Table II identifies the experiments and gives the composition in terms of percent by weight of the chemically combined styrene and butadiene in the copolymer starting material. The table also gives the total dose in megarads to which the copolymer was subjected and the percent of diammonium N-(ar-vinylbenzyl)iminodiacetate used in making the graft copolymer.

Table II

| Run No. | Styrene, Percent | Butadiene, Percent | Radiation Dose, Megarads | Diammonium N-(ar-vinyl-benzyl)imino-diacetate, Percent | Product, Remarks |
|---|---|---|---|---|---|
| 1 | 25 | 75 | 2.5 | 5 | Good adhesion, no blisters, no rust, no fading. |
| 2 | 55 | 45 | 2.5 | 5 | Smooth, no blisters, good adhesion, no rust, no fading. |
| 3 | 60 | 40 | 2.5 | 5 | Smooth, good adhesion, no blisters, no rust. |
| 4 | 66 | 34 | 2.5 | 5 | Good adhesion, no blisters, no rust, no fading. |
| 5 | 80 | 20 | 2.5 | 5 | Fair adhesion, few blisters, no rust, no fading. |

EXAMPLE 3

A synthetic latex of a copolymer of 60 percent by weight of styrene and 40 percent of butadiene, and similar to that described in Example 1, was exposed to a beam of high speed electrons from a General Electric Resonant Transformer operating at a beam current of 1 milliampere and a potential of 1 mev. for a total dose of 2.4 megarads. A weighed portion of the irradiated latex was mixed with ammonium N-(ar-vinylbenzyl)iminodiacetate in amount corresponding to 5 percent by weight of the copolymer in the latex and the resulting dispersion was left standing at room temperature (about 25° C.) for a period of 24 hours to form a graft copolymer. In Experiment A the monomer was diammonium N-(ar-vinylbenzyl)iminodiacetate. In Experiment B no monomer was added, this being the blank for comparison. To each of the dispersions A and B there was added a standard iron oxide pigment dispersion consisting of 72 parts by weight of ferric oxide, 72 parts of Davison clay, 144 parts of barytes, 107 parts of water, 15.6 parts of a 5 weight percent solution of methyl cellulose, together with a small amount of an emulsifying agent and 1.6 parts of ethyl alcohol, which pigment dispersion was added in amount corresponding to 1 part by weight of the pigment per part of the latex. The resulting paint formulation was coated onto bonderized No. 20 gauge steel panels of about 4" x 12" size by means of the Meyer wire wound rod of Example 1. The coating was dried in air at room temperature for a period of 24 hours, but without the baking operation described in previous examples. Thereafter, the coated and dried panels were immersed to a depth of about one-half of the coating in a water bath maintained at a temperature of 95° F. for a period of 300 hours. After this treatment the panels were removed from the water bath and were examined for rusting, peeling, blistering and fading. The observations were as follows:

| A | B |
|---|---|
| Diammonium N-(ar-vinylbenzyl)iminodiacetate | Blank |
| No rust. Smooth, no blisters. No fading. Good adhesion. | Badly rusted. Blistered. Severe fading. Peeling. |

EXAMPLE 4

A synthetic latex of a copolymer of 60 percent by weight of styrene and 40 percent of butadiene, similar to that employed in Example 1, was subjected to high speed electrons from a General Electric Resonant Transformer operating at a beam current of 1 milliampere and 1 mev. potential for a total dose of 5 megarads. Thereafter, to the latex was added 4 percent by weight, based on the weight of the butadiene-styrene copolymer, of the disodium salt of N-(ar-vinylbenzyl)aspartic acid. The resulting mixture was heated at a temperature of 50° C. for a period of 16 hours. The graft copolymer latex was mixed with ferric oxide pigment, was coated onto metal strips, air dried, baked and tested by immersion as was done in Example 1. The coating showed excellent adhesion, and no rusting or peeling.

EXAMPLE 5

Samples of a synthetic latex of a copolymer of 60 percent by weight styrene and 40 percent by weight butadiene, similar to that employed in Example 1, were mixed with 2, 4, and 6 percent by weight, respectively, of the diammonium salt of N-(ar-vinylbenzyl)iminodiacetic acid, based on the weight of the copolymer in the latex. The latex-monomer mixtures were then exposed to beta irradiation from a General Electric Resonant Transformer operating at a beam current of one milliampere and a potential of one million electron volts for a total dose of three megarads. The latex samples were thereafter pigmented and applied to panels and baked and, finally, tested, all according to the procedure of Example 1.

A sample of the original latex without the added monomer was irradiated also with the same dose and used as a blank for comparison. Results showed the graft latexes to be superior to the ungrafted blank with respect to rusting, peeling, blistering and fading. There was substantially no difference in the two samples containing the higher amounts of grafted monomer. The sample containing only two percent was markedly superior to the blank.

EXAMPLE 6

Samples of a 60/40 styrene-butadiene synthetic latex were mixed with 4 and 8 weight percent, respectively, of the diammonium salt of N-(ar-vinylbenzyl)aspartic acid. Mutual irradiation of the mixtures was accomplished in the manner of Example 5 and a dose of 1.5 megarads was given. The mixtures were then heated for one hour at 50° C., cooled, pigmented and applied to panels, baked and tested as in Example 1. A sample of latex was used as a blank as in the preceding example.

Both samples containing the grafted monomer were substantially the same and much superior to the blank in all respects.

EXAMPLE 7

Samples of a styrene-butadiene latex similar to that used in the preceding example were irradiated with beta rays to a dose of 3 megarads. To four of the samples the diammonium salt of N-(ar-vinylbenzyl)aspartic acid was added in amounts of 2, 4, 6 and 8 percent, respectively, based on the weight of the copolymer in the latex. Nothing was added to the fifth sample. All samples were heated for one hour at 50° C. and then cooled; pigment was added, the paint was applied to panels which were then baked and tested in the manner of Example 1. The graft copolymer coatings were much superior to the non-graft copolymer coating.

EXAMPLE 8

In the preparation of the N-(ar-vinylbenzyl-iminodiacetic acid there are two isomers present in the resulting product. To show that both isomers were active in the grafting reaction and resulted in the same good grafted latex, the following experiments were carried out.

The isomers of the monomer were separated by solvent extraction and fractional crystallization. Two isomers, one melting at 180° C. (A) and the other melting at 130° C. (B), were isolated. The isomers were separately added to samples of previously irradiated latex as in Example 7. The dose of beta radiation received was 1.7 megarads. Additions of monomer were made as shown in Table III, using the diammonium salt of N-(ar-vinylbenzyl)iminodiacetic acid isomers A and B.

*Table III*

| Experiment Number | Isomer Used | Percent[1] Isomer | Evaluation of Painted Panels |
|---|---|---|---|
| 1 | A | 4 | Good appearance (very slight fading, no rusting or peeling). |
| 2 | A | 8 | Excellent appearance (no fading, rusting or peeling). |
| 3 | B | 4 | Good appearance. |
| 4 | B | 8 | Excellent appearance. |
| [2] 5 | --- | --- | Very poor appearance (severe rusting, peeling and fading). |
| [3] 6 | AB | 8 | Poor appearance (severe fading, moderate rusting and peeling). |

[1] The percent monomer used is calculated on a dry basis; i.e., weight of monomer shown as a percent of the weight of the copolymer in the latex
[2] Irradiated only, no monomer added.
[3] Monomer containing both isomers was used but latex was not irradiated.

EXAMPLE 9

The sodium salt of 2-(vinylphenyl)glycine was added (in amounts of 4 and 8 percent by weight based on the weight of the copolymer) to samples of a 60/40 styrene-butadiene latex. These mixtures of monomer and latex were then mutually irradiated by means of the General Electric Resonant Transformer to a dose of 3 megarads. The resulting grafted latexes were pigmented, applied to panels, baked and tested as in Example 5. The coatings had good adhesion, a smooth appearance and were free from rusting and fading.

EXAMPLE 10

The sodium salt of N,N-bis-(ar-vinylbenzyl)glycine was added in amounts of 4 and 8 percent by weight, based on the weight of the copolymer to samples of a 60/40 styrene-butadiene copolymer latex. The mixtures of monomer and latex were irradiated to a dose of 2.4 megarads. The resulting graft copolymer latex was pigmented, applied to panels baked and tested as in Example 5. The coatings had good adhesion, were smooth in appearance and were free from rusting and fading.

EXAMPLE 11

A styrene-butadiene latex, of a copolymer of 80 percent styrene and 20 percent butadiene, was irradiated by means of a General Electric Resonant Transformer with beta rays to a dose of about 2.5 megarads. Samples of the irradiated latex were then mixed with the sodium salt of N,N-bis-(ar-vinylbenzyl)glycine in amounts of 1, 2, 4, 6, 12, and 20 percent respectively and heated for one hour at 50° C. The grafted latex samples were then pigmented and applied to steel panels baked, and tested as in Example 5.

The samples containing 1 through 6 percent monomer were better than the blank. In each of those cases the formed film was hard, adherent, and resistant to rusting, fading, and peeling. The 80/20 latex is not film-forming without the grafted monomer. The samples containing 12 and 20 percent showed no improvement over the blank containing no grafted material.

We claim:

1. A composition comprising an aqueous dispersion of a graft copolymer consisting of a minor amount by weight of an alkali salt of a vinylphenyl amino carboxylic acid having the general formula:

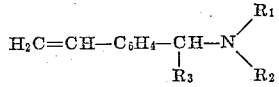

wherein $R_1$ represents a radical selected from the group consisting of —H, —$CH_2$—COOM and radicals of the formula

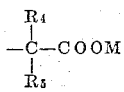

wherein $R_4$ and $R_5$ individually represent a radical selected from the group consisting of —H, —$CH_2$—COOM, —$CH_2$—$CH_2$—COOM and alkyl radicals containing from 1 to 4 carbon atoms, at least one of the radicals $R_2$ and $R_5$ being selected from the group consisting of —H and alkyl, $R_2$ represents a radical selected from the group consisting of —H, —$CH_2 \cdot C_6H_4 \cdot CH=CH_2$ and —$CH_2$—COOM, $R_3$ represents a radical selected from the group consisting of —H, and —COOM, at least one of said $R_1$, $R_2$ and $R_3$ radicals containing the carboxylate group, and wherein M is a member of the group consisting of ammonium bases and alkali metals, polymerized in admixture with a synthetic latex containing a predominant amount by weight of a previously prepared copolymer of from 20 to 75 percent by weight of butadiene and from 80 to 25 percent of styrene which aqueous dispersion contains from about 20 to about 50 percent by weight of said graft copolymer.

2. A composition according to claim 1, wherein the monomer is disodium N-(ar-vinylbenzyl)aspartate.

3. A composition according to claim 1, wherein the monomer is diammonium N-(ar-vinylbenzyl)iminodiacetate.

4. A composition according to claim 1, wherein the aqueous dispersion of the graft copolymer contains an inorganic pigment.

5. A composition according to claim 4 wherein the inorganic pigment comprises ferric oxide.

6. A composition according to claim 1 wherein the monomer is diammonium N-(ar-vinylbenzyl)aspartate.

7. A composition according to claim 1, wherein the monomer is ammonium N-(ar-vinylphenyl)glycinate.

8. A composition comprising a homogeneous mixture of from 40 to 90 percent by weight of (1) an aqueous dispersion of a graft copolymer consisting of a minor amount by weight of an alkali salt of a vinylphenyl amino carboxylic acid having the general formula:

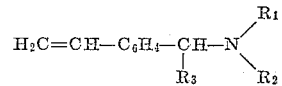

wherein $R_1$ represents a radical of the group consisting of —H, —$CH_2$—COOM and radicals of the formula

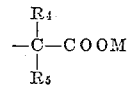

wherein $R_4$ and $R_5$ individually represent a radical selected from the group consisting of —H, —$CH_2$—COOM, —$CH_2$—$CH_2$—COOM and alkyl radicals containing from 1 to 4 carbon atoms, at least one of the radicals $R_2$ and $R_5$ being selected from the group consisting of —H and alkyl, $R_2$ represents a radical selected from the group consisting of —H, —$CH_2 \cdot C_6H_4 \cdot CH=CH_2$ and

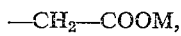

$R_3$ represents a radical selected from the group consisting of —H and —COOM, at least one of said $R_1$, $R_2$ and $R_3$ radicals containing the carboxylate group, and wherein M is a member of the group consisting of ammonium bases and alkali metals, polymerized in admixture with a synthetic latex containing a predominant amount by weight of a previously prepared copolymer of from 20 to 75 percent by weight of butadiene and from 80 to 25 percent of styrene, and (2) from 60 to 10 percent by weight of an aqueous dispersion of an inorganic pigment, said aqueous dispersion containing from 20 to 50 percent by weight of said graft copolymer and said inorganic pigment dispersion containing from 25 to 80 percent by weight of inorganic pigment.

9. A composition according to claim 8, wherein the monomer is diammonium N-(ar-vinylbenzyl)aspartate.

10. A composition according to claim 8, wherein the monomer is ammonium N-(ar-vinylphenyl)glycinate.

11. A composition according to claim 8 wherein the pigment comprises ferric oxide.

12. A composition comprising a homogeneous mixture of from 40 to 90 percent by weight of (1) an aqueous dispersion of a graft copolymer consisting of from 0.5 to 10 percent by weight of diammonium N-(ar-vinylbenzyl)iminodiacetate polymerized in admixture with a synthetic latex of a previously prepared copolymer of from 25 to 80 percent by weight of styrene and from 75 to 20 percent by weight of butadiene, under the action of high energy ionizing radiations at an intensity of at least 40,000 rads per hour for a dose of from 0.5 to 10 megarads, and in amount corresponding to from 99.5 to 10 percent by weight of the diammonium N-(ar-vinylbenzyl)iminodiacetate, based on the sum of the weights of said monomer and said copolymer, and (2) from 60 to 10 percent by weight of an aqueous dispersion of an inorganic pigment, said aqueous colloidal dispersion containing from 20 to 50 percent by weight of said graft copolymer and said aqueous pigment dispersion containing from 25 to 80 percent by weight of said inorganic pigment.

References Cited in the file of this patent

UNITED STATES PATENTS

| | | |
|---|---|---|
| 2,744,836 | Schubert et al. | May 8, 1956 |
| 2,754,291 | Pollack | July 10, 1956 |
| 2,840,603 | Mock et al. | June 24, 1958 |
| 2,859,201 | Uraneck et al. | Nov. 4, 1958 |
| 2,910,445 | Mock et al. | Oct. 27, 1959 |

FOREIGN PATENTS

| | | |
|---|---|---|
| 1,101,682 | France | Apr. 27, 1955 |